(12) United States Patent
Guzman Escalante et al.

(10) Patent No.: US 11,525,428 B1
(45) Date of Patent: Dec. 13, 2022

(54) RETAINING CLIP AND CONNECTION ASSEMBLY INCLUDING SAME

(71) Applicant: Robert Bosch GmbH, Stuttgart (DE)

(72) Inventors: Emmanuel Alfonso Guzman Escalante, San Luis Potosi (MX); Cesar Omar Medina Juarez, San Luis Potosi (MX); John Casari, Manchester, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/543,059

(22) Filed: Dec. 6, 2021

(51) Int. Cl.
*F16B 2/24* (2006.01)
*F02M 61/14* (2006.01)
*F02M 61/16* (2006.01)

(52) U.S. Cl.
CPC .......... *F02M 61/14* (2013.01); *F02M 61/168* (2013.01); *F16B 2/248* (2013.01); *F02M 2200/853* (2013.01); *F02M 2200/855* (2013.01); *F02M 2200/856* (2013.01)

(58) Field of Classification Search
CPC ................. F02M 61/14; F02M 61/168; F02M 2200/853; F02M 2200/855; F02M 2200/856; F16B 2/248
USPC ........................................................ 123/470
See application file for complete search history.

(56) References Cited

U.S. PATENT DOCUMENTS

| | | | | |
|---|---|---|---|---|
| 2,913,261 A * | 11/1959 | Matchett | ............ | F16L 37/0885 285/321 |
| 3,534,988 A * | 10/1970 | Lindsey | ................ | F16L 37/144 29/523 |
| 4,244,608 A * | 1/1981 | Stuemky | ............... | F16L 37/144 285/305 |
| 4,948,175 A * | 8/1990 | Bartholomew | ....... | F16L 37/144 285/39 |
| 5,240,424 A * | 8/1993 | Honma | ................ | H01R 13/639 439/95 |
| 5,381,999 A * | 1/1995 | Ricco | ................. | F02M 63/0036 251/129.18 |
| 5,826,920 A * | 10/1998 | Bartholomew | ....... | F16L 37/088 285/305 |
| 5,959,828 A * | 9/1999 | Lewis | ................. | H01R 13/622 361/215 |
| 6,604,760 B2 * | 8/2003 | Cresswell | ........... | F16L 37/0887 285/305 |
| 6,983,958 B2 * | 1/2006 | Rautureau | ........... | F16L 37/0885 285/305 |

(Continued)

*Primary Examiner* — Erick R Solis
(74) *Attorney, Agent, or Firm* — Kelly McGlashen; Maginot, Moore & Beck LLP

(57) ABSTRACT

A connection assembly is used to detachably connect fuel injector to an injector cup of a fuel rail. The connection assembly includes the injector cup that receives and supports the fuel injector, a pair of retaining pins that an configured to retain an inlet end of the fuel injector within a bore of the injector cup, and a retaining clip that retains the retaining pins in corresponding through holes provided in the injector cup. The retaining clip is C-shaped and partially encircles the injector cup such that a first end of the retaining clip extends into the through hole that receives the first pin, the second end of the retaining clip extends into the through hole that receives the second pin. The retaining clip is configured to prevent the pins from exiting the respective through holes and minimize assembly noise.

11 Claims, 4 Drawing Sheets

(56) References Cited

U.S. PATENT DOCUMENTS

| | | | | |
|---|---|---|---|---|
| 7,387,318 B2* | 6/2008 | Yoshida | F02M 35/10144 | 285/321 |
| 7,438,328 B2* | 10/2008 | Mori | F02M 35/10144 | 285/305 |
| 7,597,362 B2* | 10/2009 | Hartmann | F16L 37/144 | 285/321 |
| 7,866,711 B2* | 1/2011 | Kerin | F16L 37/144 | 285/308 |
| 8,256,599 B2* | 9/2012 | Goto | F16D 25/10 | 267/161 |
| 8,348,582 B2* | 1/2013 | Bithell | F16L 37/144 | 24/522 |
| D690,192 S * | 9/2013 | Takakuwa | D8/396 | |
| 9,016,729 B2* | 4/2015 | Ishida | F16L 37/0841 | 285/308 |
| D745,382 S * | 12/2015 | Faria | D8/396 | |
| 9,567,961 B2 | 2/2017 | Cass et al. | | |
| 9,957,938 B2 | 5/2018 | Roseborsky et al. | | |
| 10,056,746 B1* | 8/2018 | Smith | H02G 3/06 | |
| 11,137,094 B2* | 10/2021 | Weragoda Vidanelage | F16L 21/08 | |
| D945,256 S * | 3/2022 | Kousik | D8/396 | |
| 2003/0154579 A1* | 8/2003 | Disher | B43M 99/001 | 24/462 |
| 2004/0183301 A1* | 9/2004 | Yoshida | B29C 66/1224 | 285/305 |
| 2005/0218650 A1* | 10/2005 | Pepe | F16L 37/0885 | 285/308 |
| 2005/0230968 A1* | 10/2005 | Takayanagi | F16L 37/098 | 285/93 |
| 2010/0012093 A1* | 1/2010 | Pepperine | F02M 69/465 | 123/456 |
| 2013/0082459 A1* | 4/2013 | Kaneko | F16L 37/144 | 285/93 |
| 2016/0023817 A1* | 1/2016 | Sechrist | H01R 13/746 | 439/573 |
| 2016/0025053 A1 | 1/2016 | Reinhardt et al. | | |
| 2016/0333836 A1 | 11/2016 | Lang | | |
| 2021/0107592 A1* | 4/2021 | Shimizu | B62M 3/00 | |

* cited by examiner

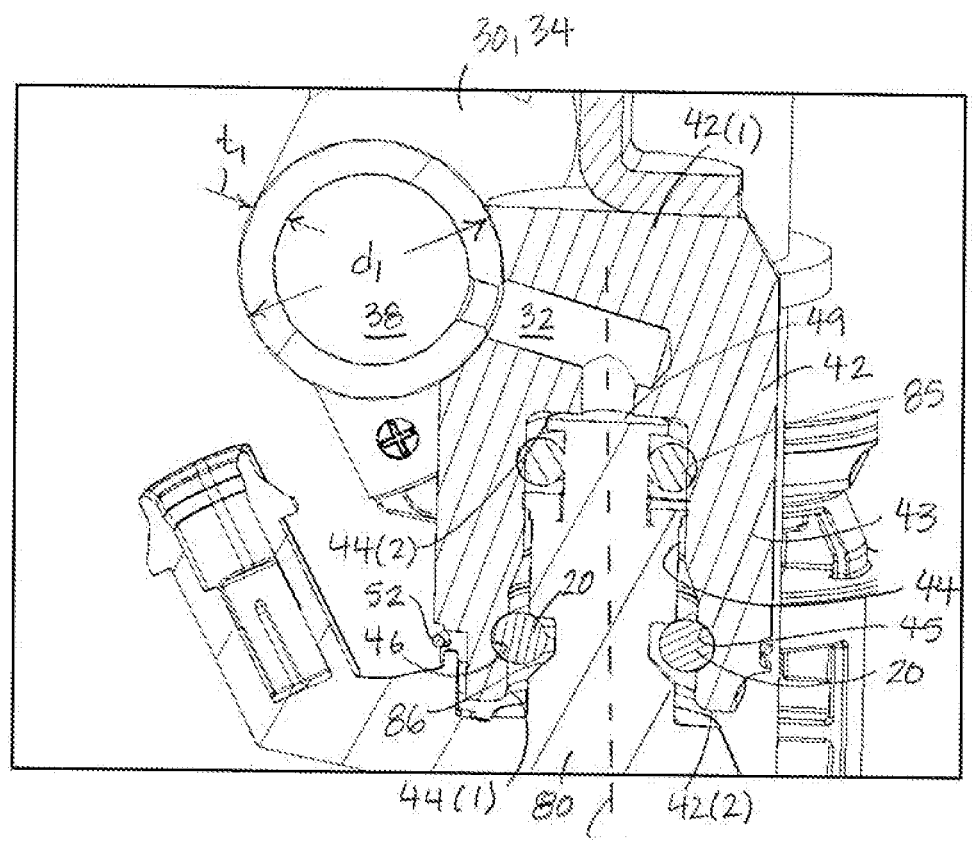

RETAINING CLIP AND CONNECTION ASSEMBLY INCLUDING SAME

BACKGROUND

A fuel delivery system may include a fuel rail that is configured to supply fuel to the cylinders of an engine. The fuel rail is supplied with fuel by a fuel supply line that is connected to an inlet of the fuel rail. Although plastic fuel rails are known, metal fuel rails may be used to deliver fuel at high pressure. The rails include a main fuel supply pipe referred to as a "log". As used herein, the term "high pressure" refers to pressures greater than 250 bar. The log has an inlet that connects the fuel rail to the fuel line, and a main fuel channel that communicates with the inlet. In addition, the fuel rail includes multiple injector cups that depend integrally from an outer surface of the log. The injector cups receive and support fuel injectors that inject fuel into the intake manifold or cylinder heads of an internal combustion engine. In some applications, the fuel rail may supply high-pressure fuel through the fuel injectors by directly injecting into corresponding engine cylinder combustion chambers. The connection of the fuel injector to the injector cup is a critical joint maintaining the fluid-tightness of the fuel rail assembly in high pressure fuel delivery systems.

Some conventional fuel delivery systems employ connections having shapes and materials that require high precision in manufacture and assembly, which result in increased manufacturing complexity and cost. Some conventional fuel delivery systems employ connections that use large amounts of material and require large amounts of packaging space within the engine envelope, which may limit their applications. Some conventional fuel delivery systems employ connections that may become dislodged during transportation, vehicle assembly or operation.

It is desirable to provide a connection between an injector cup of a fuel rail and a fuel injector that provides a reliable connection, requires minimal space and which has few parts and is relatively simple to manufacture and install.

SUMMARY

A fuel delivery system is provided that includes a connection assembly that retains a fuel injector within an injector cup of a fuel rail. The connection assembly includes a pan of retaining pins that are disposed in respective through holes of the injector cup. The retaining pins engage the fuel injector and retain the fuel injector within the injector cup. In addition, the connection assembly includes a C-shaped retaining clip that retains the retaining pins in the respective through holes of the injector cup.

The ends of the retaining clip form retention hooks that engage end faces of the retaining pins so as to prevent the retaining pins from becoming dislodged from their respective through holes of the injector cup. In addition, the hooks facilitate assembly of the retaining clip with the injector cup since the hooks provide a lead angle surface that can be leveraged against a sidewall of the injector cup to spread the retaining clip for assembly with the injector cup after the injector and retaining pins have been assembled.

The retaining clip contains a pitch bend "coil spring" section shape that produces a de-coupled retention force perpendicular to the pin axial travel. This force "springs" the clip between the top and bottom of a circumferential sidewall groove in the exterior of the injector cup. This provides forces that eliminate "rattle" or loose clips or pins.

The retaining clip allows simple, low force assembly while providing a high integral retention force.

In the assembled configuration, the retaining clip resides in the sidewall groove with ends of the hooks disposed inside the retaining pin through holes, thus requiring no special machining to provide effective pin retention.

The injector cup sidewall groove guides the retaining clip during insertion and the hooks use the undercut of the pin mounting hole as a robust mounting position. To service or replace the fuel injector, the retaining clip is cut from the injector cup (e.g., destroyed) and discarded, and thus is a "throw away" design. Because the retaining clip engages the injector cup via the groove and hooks, the retaining clip is robustly retained, requiring destruction to remove while requiring a low assembly force and simple slide press with spreader tooling to install. In some applications, the retaining clip can be incorporated into the nest that installs the pins in a "collapse" mechanism there by reducing assembly time and cost.

The retaining clip is formed of suitable spring steel that allows for forming and retention of the finished shape of a C with retention hooks on the open ends. Various wire diameters or profiles are possible as well as materials and sizing of the retaining clip inner diameter and hook shapes and sizes.

In some aspects, a retaining clip includes an elastic body that partially encircles a first axis such that the retaining clip has a C-shaped profile when viewed in a direction parallel to the first axis. The retaining clip includes a first end, a second end and a midportion that extends helically between the first end and the second end such that the first end is offset from the second end in a direction parallel to the first axis. The retaining clip includes a first radius of curvature at a first point midway between the first end and the second end. In addition, the retaining clip includes a second radius of curvature at each of a second point and a third point. The second point is located between the first point and the first end, and the third point is located between the first point and the second end. The first radius of curvature is greater than the second radius of curvature.

In some embodiments, the retaining clip is uniform in cross-sectional shape between the first end and the second end.

In some embodiments, the retaining clip has a circular cross-sectional shape.

In some embodiments, the second point is disposed in a first portion of the retaining clip. The first portion includes the first end and has a length dimension in a range of 3 percent to 15 percent of a length of the retaining clip. The third point is disposed in a second portion of the retaining clip. The second portion includes the second end and has a length dimension in a range of 3 percent to 15 percent of the length of the retaining clip. The length of the retaining clip corresponds to a distance between the first end and the second end.

In some embodiments, the pitch of the midportion is in a range of 0.3 times to 3 times a diameter of a cross section of the retaining clip.

In some aspects, a retaining clip includes an elastic body that partially encircles a first axis such that the retaining clip has a C-shaped profile when viewed in a direction parallel to the first axis. The retaining clip includes a first end that comprises a first hook, a second end that comprises a second hook, and a midportion that extends helically between the first end and the second end such that the first end is offset from the second end in a direction parallel to the first axis.

In some embodiments, the first hook and the second hook each define a concavity that opens toward the first axis.

In some aspects, a fuel rail assembly includes a fuel rail, a fuel injector that is supported on the fuel rail, a first retaining pin, a second retaining pin and a retaining clip. The fuel rail includes a log having a main fuel channel and an injector cup that is disposed on an outer surface of the log. The injector cup includes a sidewall that encircles a first axis. An inner surface of the sidewall defines a blind bore that opens at one end of the injector cup, is coaxial with the first axis, and is in fluid communication with the main fuel channel. An outer surface of the sidewall defines a circumferentially-extending sidewall groove. The sidewall defines a first retainer through hole that is coaxial with a second axis that is perpendicular to the first axis and is disposed on one side of the first axis. In addition, the sidewall defines a second retainer through hole that is parallel to the second axis and is disposed on an opposite side of the first axis relative to the first retainer through hole. The fuel injector includes an injector housing having a fuel inlet end that is disposed in the bore and a fuel outlet end that is opposite to the fuel inlet end. The fuel outlet end is disposed outside of the bore. The fuel injector includes an annular injector groove located between a mid point of the injector housing and the fuel inlet end. The injector groove is disposed in the bore. The first retaining pin is disposed in the first retainer through hole such that a portion of the first retaining pill resides in the injector groove, and the second retaining pin is disposed in the second retainer through hole such that a portion of the second retaining pin resides in the injector groove, whereby the first and second retaining pills retain the fuel inlet end of the fuel injector within the bore. In addition, the retaining clip partially encircles an outer surface of the injector cup. The retaining clip having a first end that is disposed in the first retainer through hole and a second end that is disposed in the second retainer through hole.

In some embodiments, the first retainer through hole is a hole that intersects the sidewall surface at a first sidewall location and a second sidewall location. The second retainer through hole is a hole that intersects the sidewall at a third sidewall location and a fourth sidewall location. The first end of the retaining clip is disposed in the first retainer through hole at the first sidewall location. The second end of the retaining clip is disposed in the second retainer through hole at the third sidewall location. In addition, a midportion of the retaining clip overlies the first retainer through hole at the second sidewall location and the second retainer through hole at the fourth sidewall location.

In some embodiments, the first retainer through hole is a hole that intersects the sidewall surface at a first sidewall location and a second sidewall location. The second retainer through hole is a hole that intersects the sidewall at a third sidewall location and a fourth sidewall location. The first end of the retaining clip is disposed in the first retainer through hole at the first sidewall location and contacts the first retaining pin, and the second end of the retaining clip is disposed in the second retainer through hole at the third sidewall location and contacts the second retaining pin.

In some embodiments, the retaining clip includes a midportion that is disposed between the first end and the second end, and the midportion is disposed in an annular sidewall groove defined in an outer surface of the sidewall.

In some embodiments, the injector cup includes an annular sidewall groove provided in an outer surface of the sidewall. The sidewall groove intersects the first retainer through hole and the second retainer through hole. In addition, the retaining clip extends helically between the first end and the second end, and a midportion of the retaining clip is disposed in the sidewall groove. The mid portion applies a first axial force to a first portion of the sidewall groove, and a second axial force to a second portion of the sidewall groove, where the first axial force and the second axial force are applied in opposite directions.

BRIEF DESCRIPTION OF THE FIGURES

FIG. 3 is a cross-sectional view of the fuel rail as seen along line 3-3 of FIG. 2.

FIG. 4 is a perspective view of a fuel injector and retaining pins, shown in isolation from respective injector cup and the fuel rail.

FIG. 5 is a cross-sectional view of the fuel rail as seen along line 5-5 of FIG. 2.

DETAILED DESCRIPTION

Figure 1:
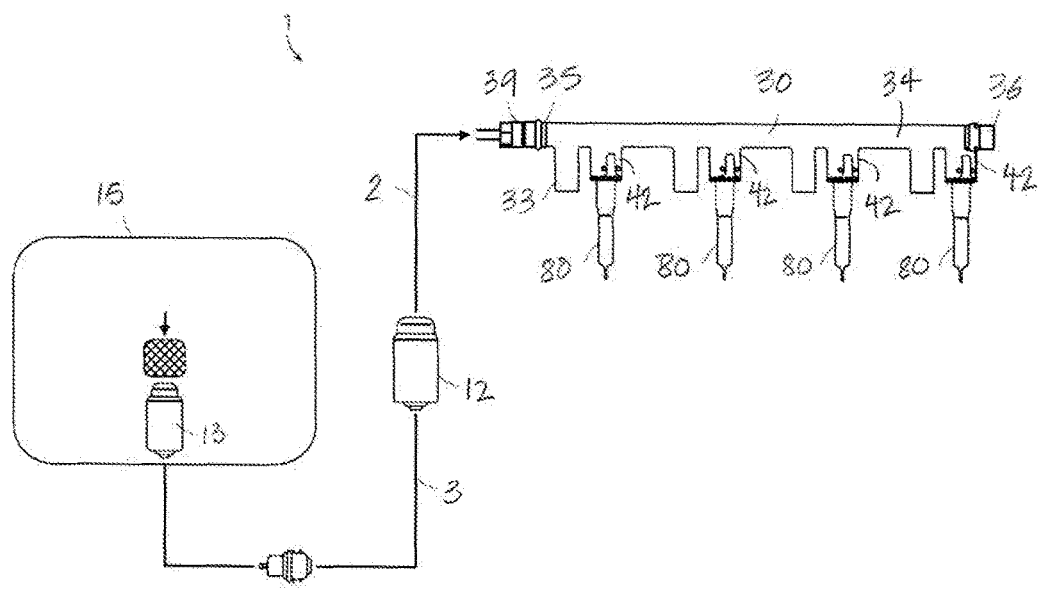
FIG. 1 is a schematic view of a fuel delivery system that includes a fuel rail that receives high pressure fuel from a fuel tank via a fuel supply line.
Figure 2:
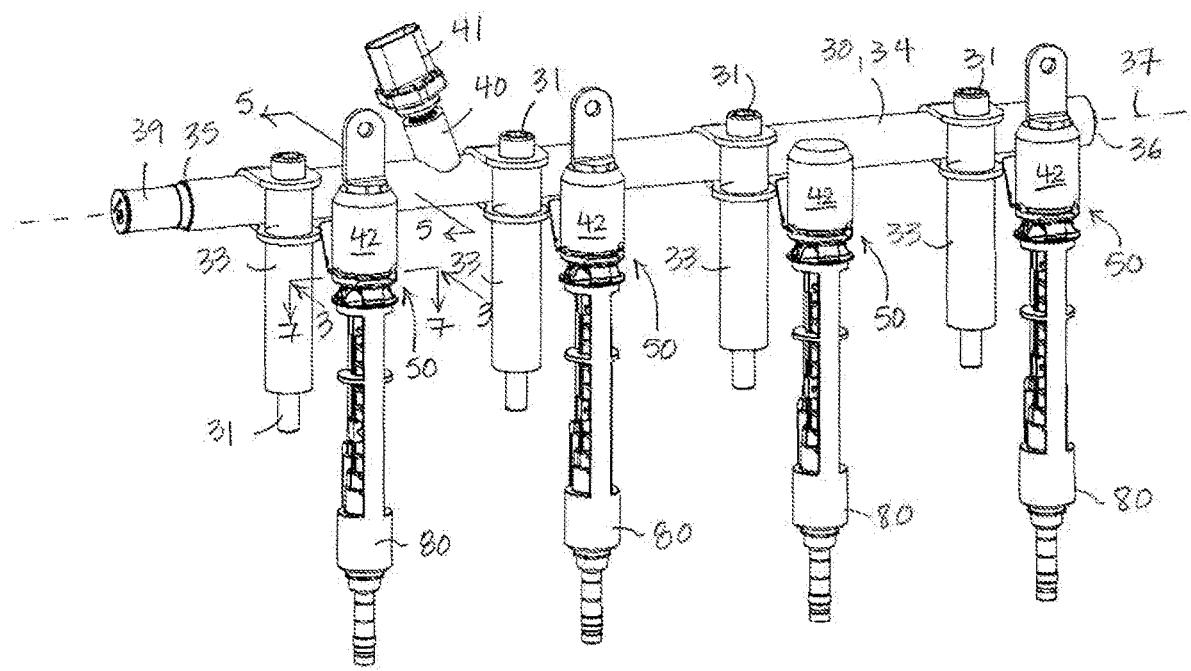
FIG. 2 is a perspective view of the fuel rail including fuel injectors connected thereto.

Referring to FIGS. 1-3, a fuel delivery system 1 includes a fuel rail 30 that is configured to supply fuel to multiple fuel injectors 80 that inject fuel directly into the cylinders of an internal combustion engine (not shown). The fuel rail 30 receives high pressure fuel from a high-pressure fuel supply line 2. The fuel supply line 2 is connected to a fuel tank 15 via a high-pressure fuel pump 12. The high-pressure fuel pump 12 is connected via a low-pressure fuel supply line 3 to a low-pressure fuel pump 13 (e.g., a "fuel sender") disposed inside the fuel tank 15. The fuel delivery system 1 is configured to deliver high-pressure fuel to the fuel rail 30, which in turn delivers high-pressure fuel to the fuel injectors 80. The fuel delivery system 1 includes a fuel injector connection assembly 50 that provides a reliable, fluid-tight mechanical connection between an injector cup 42 of the fuel rail 30 and the respective fuel injector 80, as discussed in detail below.

The fuel rail 30 is configured to provide high-pressure distribution of fuel and includes a log 34 and injector cups 42 that depend integrally from the log 34. The fuel rail 30 also includes mounting bosses 33 that receive fasteners 31 that secure the fuel rail 30 to the vehicle engine.

The log 34 is an elongate hollow tube that provides a common rail or manifold. In the illustrated embodiment, the log 34 is cylindrical, but is not limited to having a cylindrical shape. The log 34 includes a log first end 35, a log second end 36 that is opposed to the log first end 35, and a fuel rail longitudinal axis 37 that extends between the log first and second ends 35, 36. The log 34 has adequately thick walls to accommodate high fuel pressures, and an inner surface of the log defines the main fuel channel 38 through which fuel is supplied from the fuel tank 15 via the fuel pump 12. The centerline of the main fuel channel 38 coincides with the fuel rail longitudinal axis 37. The log material and dimensions are determined by the requirements of the specific application. For example, in some embodiments, the log 34 is a tube made of stainless steel, having a diameter d1 in the order of 10 mm to 30 mm and having a wall thickness t1 in the order of 1.5 to 4 mm. In some embodiments, the log 34 may include a boss 40 configured to receive a pressure sensor 41. One end of the log 34, for example the log first end 35, is shaped to provide an inlet 39 that, in use, is connected to the fuel supply line 2. In the illustrated embodiment, the opposed end of the log 34, for example the log second end 36, is closed.

The number of logs 34 included in the fluid delivery system 1 can be greater than one. For example, in sonic V-engine configurations, a log 34 is provided for each side of the V, and additional pipes 10 of the nature of fuel supply line 2 may be used to transfer fuel between the respective logs 34. In another example, a Y block for a V-engine configuration may have two pipes supplying fuel to respective logs, with the Y block being fed from the pump via a single pipe, where all pipes are of the nature of fuel supply line 2.

The injector cups 42 are disposed on an outer surface of the log 34. In the illustrated embodiment, the injector cups 42 protrude integrally from the log 34 and are spaced apart along the log outer surface in a direction parallel to the fuel rail longitudinal axis 37. Each injector cup 42 is configured to distribute pressurized fuel to a respective individual cylinder of the engine via a fuel injector 80. To this end, each injector cup 42 communicates with the main fuel channel 38 of the log 34 via an internal fuel passageway 32.

The number of injector cups 42 that protrude from the log 34 depends on the engine configuration. For example, when a four-cylinder engine is used, the log 34 is provided with four injector cups 42 that are spaced apart along the fuel rail longitudinal axis 37 to accommodate respective cylinder positions, and when a straight-six engine is used, the log 34 is provided with six injector cups 42 that are spaced apart along the fuel rail longitudinal axis 37 to accommodate respective cylinder positions.

Each injector cup 42 is a cup shaped structure and includes a cylindrical sidewall 43. An inner surface of the sidewall 43 defines a bore 44. Each injector cup 42 includes a proximal end 42(1) that protrudes from log outer surface and closes one end of the sidewall 43, and a distal end 42(2) that is opposite the proximal end 42(1). A centerline 47 of the sidewall 43 extends through the injector cup proximal and distal ends 42(1), 42(2), and, in the illustrated embodiment, is perpendicular to the longitudinal axis 37 of the fuel rail 30. The bore 44 intersects the distal end 42(2). In particular, the bore 44 includes an open end 44(1) that coincides with the distal end 42(2), and a blind end 44(2) that is disposed between the bore open end 44(1) and the injector cup proximal end 42(1). In applications in which the fuel rail 30 is mounted above a cylinder block of the engine, the injector cups 42 open downward.

The sidewall 43 of each injector cup 42 includes a pair of retainer through holes 45, 46. Each retainer through hole 45, 46 is linear and is configured to receive a retaining pin 20. Each retainer through hole 45, 46 has a uniform diameter and extends in a direction perpendicular to the sidewall centerline 47 and to the fuel rail longitudinal axis 37. The retainer through holes 45, 46 are parallel to each other. The retainer through holes 45, 46 are offset from the sidewall centerline 47, and are disposed on opposed sides of the sidewall centerline 47. Each retainer through hole 45, 46 intersects the bore 44 at a location that is closer to the distal end 42(2) than the proximal end 42(1). In addition, each retainer through hole 45, 46 intersects, and opens at, an outer surface of the sidewall 43 at two locations. In particular, the first retainer through hole 45 intersects the outer surface of the sidewall 43 at first and second openings 43(1), 43(2), and the second retainer through hole 46 intersects the outer surface of the sidewall 43 at third and fourth openings 43(3), 43(4). In the illustrated injector cup 42, the first and third openings 43(1), 43(3) are disposed on an opposite side of the sidewall centerline 47 relative to the second and fourth openings 43(2), 43(4).

The sidewall 43 of each injector cup 42 includes an annular sidewall groove 48 that extends about the circumference of the outer surface of the sidewall. The sidewall groove 48 encircles the sidewall 43, and intersects each of the sidewall openings 43(1), 43(2), 43(3), 43(4) that are associated with the retainer through holes 45, 46. The sidewall groove 48 receives, and serves to axially locate, a retaining clip 52 of the connection assembly 50 relative to the injector cup 42, as discussed further below.

Referring to FIGS. 3-5, each injector cup 42 is configured to receive an inlet end 81 of a fuel injector 80. The fuel injector 80 may be a high-pressure device used for direct injection into a cylinder of a gasoline engine. The fuel injector 80 may include an elongate, generally tubular injector housing 84 that supports an injector valve (not shown). The inlet end 81 of the injector housing 84 provides a fuel connection nipple that is surrounded by a circumferentially-extending O-ring injector seal 85. The injector seal 85 forms a fluid-tight seal with an inner surface of the corresponding injector cup bore 44. The injector seal 85 cooperates with an inner surface of the bore 44 of the injector cup 42 to define the high pressure fuel distribution chamber 49 within the injector cup 42. In particular, the high pressure fuel distribution chamber 49 is defined within each injector cup 42 between the injector seal 85 and the bore blind end 48(2) so as to enclose the inlet end 81 of the injector housing 84. The outlet end 82 of the injector housing 84 is opposed to the inlet end 81, and provides a valve seat (not shown) and fuel spray opening or nozzle (not shown). In addition, at a location between the inlet end 81 and a mid portion of the injector housing 84, the injector housing 84 includes a necked portion 86 of reduced diameter.

Fuel is provided at high pressure to the fuel distribution chamber 49 of the injector cup 42 via the main fuel channel 38 of the log 34 and the fuel passageways 32 of the respective injector cups 42. Thus, high pressure fuel received in the fuel rail 30 is distributed directly into each cylinder of the engine via a respective injector cup 42 and fuel injector 80. The relative geometry of the log 34, injector cups 42 and fuel injectors 80 is complex, and is dependent on engine geometry and available space within the engine system.

Figure 6:
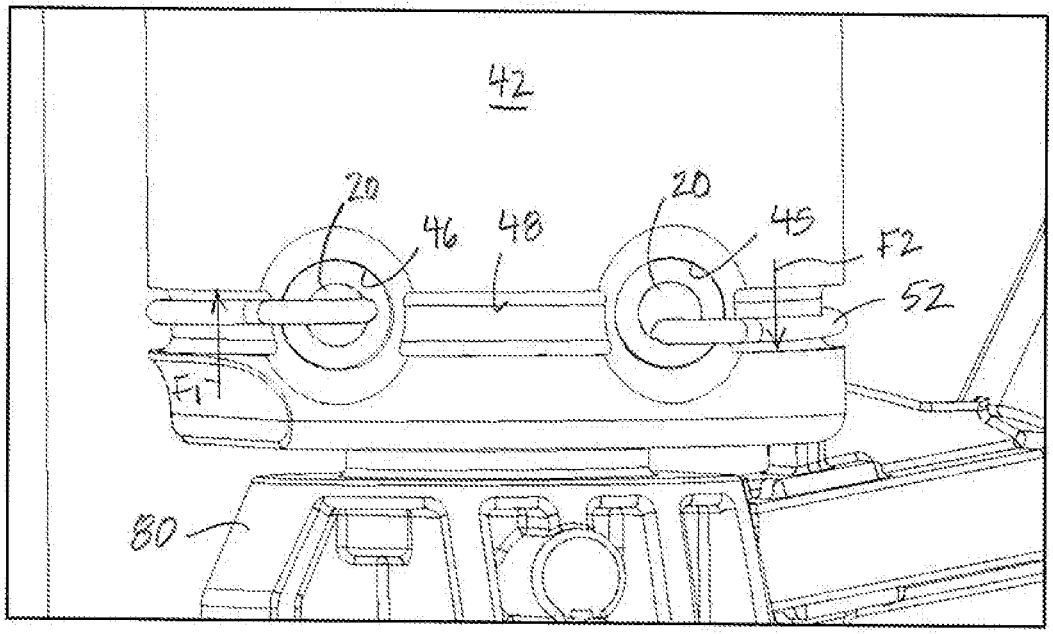
FIG. 6 is an enlarged view of a portion of the fuel injector cup indicated by broken lines in FIG. 5.
Figure 7:
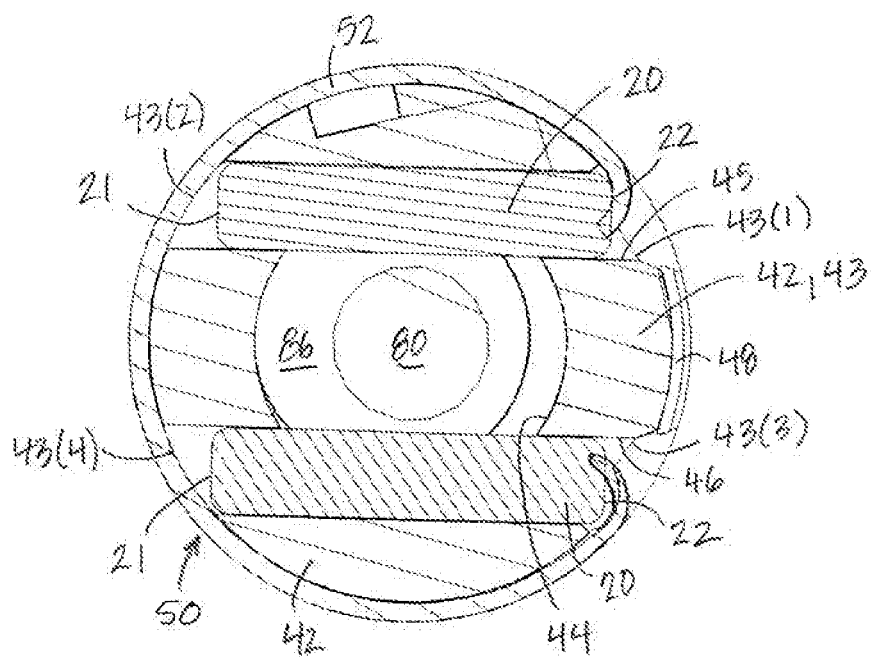
FIG. 7 is a cross-sectional view of an injector cup of the fuel rail as seen along line 7-7 of FIG. 2.
Figure 8:
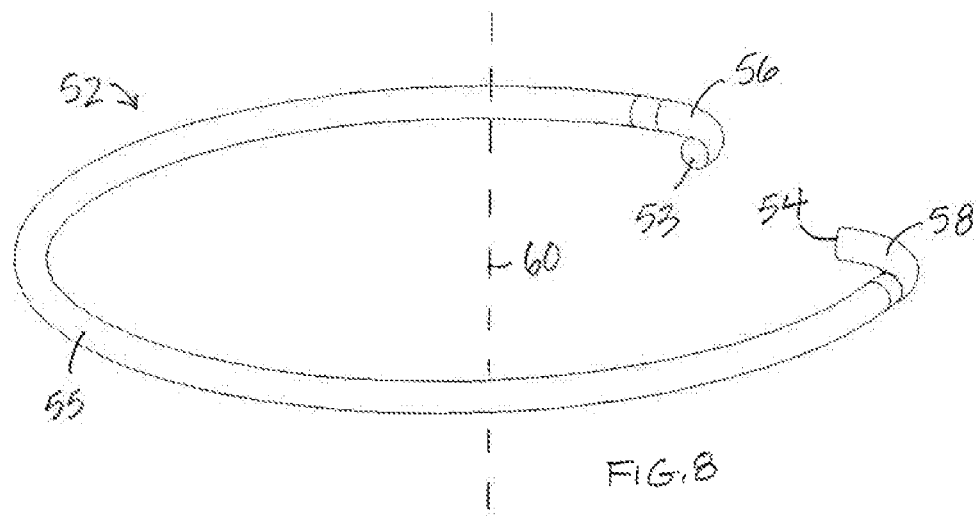
FIG. 8 is a perspective view of the retaining clip.
Figure 9:
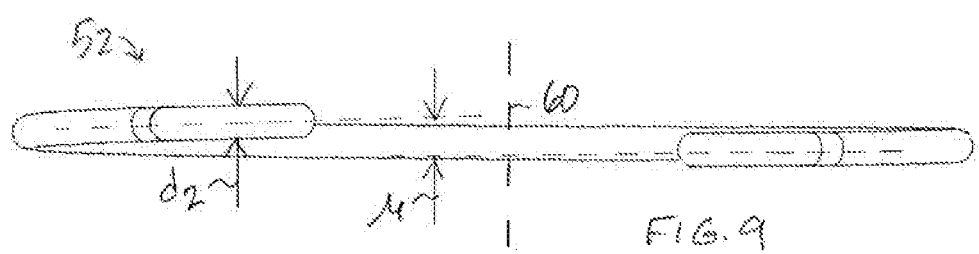
FIG. 9 is a side view of the retaining clip.
Figure 10:
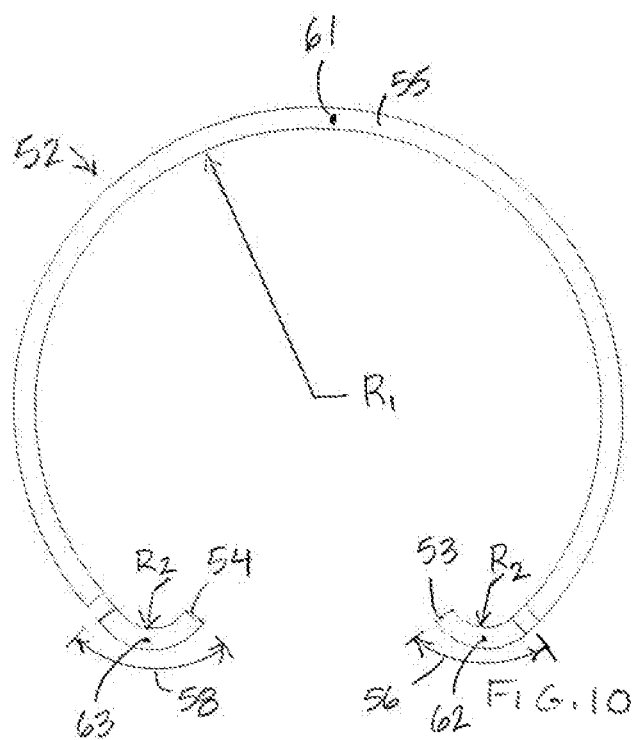
FIG. 10 is a top plan view of the retaining clip.

Referring to FIGS. 5-7, the fuel injector 80 is detachably secured to the injector cup 42 via the connection assembly 50. The connection assembly 50 includes an injector cup 42 that receives and supports a fuel injector 80, retaining pins 20 that are configured to retain the inlet end 81 of the fuel injector 42 within the bore 44 of the respective injector cup 42, and a retaining clip 52 that retains the retaining pins 20 in corresponding through holes 45, 46 provided in the injector cup 42.

In the illustrated embodiment, the fuel injector 80 is detachably secured to the injector cup 42 via a pair of retaining pins 20. In particular, a retaining pin 20 is disposed in each of the two retainer through holes 45, 46, whereby the retaining pins 20 extend through the bore 44 and pass through the fuel injector housing necked portion 86. By this configuration, the retaining pins 20 retain the fuel injector 80 within the bore 44.

In the illustrated connection assembly 50, each retaining pin 20 is an elongate, rigid cylindrical rod of uniform diameter. Each retaining pin 20 extends linearly between opposite ends 21, 22, and the ends 21, 22 of each pin 20 are beveled to facilitate insertion. Each retaining pin 20 is dimensioned to be received within the respective retainer through hole 45 or 46 in a press fit or clearance fit. In addition, each retaining pin 20 has a length (e.g., a distance between opposite ends) that is less than or equal to a length of the respective retainer through hole 45 or 46, such that the pin ends 21, 22 reside within the retainer through hole 45 or 46.

Referring to FIGS. 6-10, the retaining clip 52 is an elastic body that partially encircles a first axis 60 such that the retaining clip 52 has a C-shaped profile when viewed in a direction parallel to the first axis 60. The first axis 60 is co-axial with the sidewall centerline 47. The retaining clip 52 has a first end 53 and a second end 54. In the illustrated example, the retaining clip 52 is formed of a spring steel wire, and thus has a circular cross-sectional shape that is of uniform diameter between the first and second ends 53, 54.

The retaining clip 52 has a midportion 55 that extends helically between the first and second ends 53, 54 such that the first end 53 is offset from the second end 54 in a direction parallel to the first axis 60. For example, the pitch μ of the midportion is in a range of 0.3 times to 3 times a diameter d2 of a cross-section of the retaining clip 52. In addition, the mid portion 55 has a first radius of curvature R1 at a first point 61 that is midway between the first end 53 and the second end 54. The first radius of curvature R1 corresponds to the radius of curvature of the sidewall groove 48.

The retaining clip 52 has a first portion 56 that includes the first end 53, and a second portion 58 that includes the second end 54. The first and second portions 56, 58 are more tightly curved than the retaining clip midportion 55, whereby the first and second portions 56, 58 are hook shaped and each define a concavity that opens toward the first axis 60. In particular, the first and second portions 56, 58 each have a second radius of curvature R2 that is less than the first radius of curvature R1. For example, the first radius of curvature R1 is in a range of two to eight times the second radius of curvature R2.

The radius of curvature R2 of the first portion 56 is measured at a second point 62 that is disposed between the first point 61 and the first end 53. In particular, the second point 62 is disposed in the first portion 56 at a location closely adjacent to the first end 53. Likewise, the radius of curvature R2 of the second portion 58 is measured at a third point 63 that is disposed between the first point 61 and the second end 54. In particular, the third point 63 is disposed in the second portion 58 at a location closely adjacent to the second end 54. The first and second portions 56, 58 are relatively short in length as compared to an overall length of the retaining clip 52. For example, the first and second portions 56, 58 each have a length dimension in a range of 3 percent to 15 percent of a length of the retaining clip 52, where a length of the retaining clip 52 corresponds to a distance between the first and second ends 53, 54.

In use, the retaining clip 52 is received in the circumferentially-extending sidewall groove 48 so as to partially encircle the injector cup 42. To this end, the retaining clip 52 is sufficiently elastic to permit the retaining clip 52 to expand to an extent that allows assembly with the injector cup 42 (e.g., is sufficiently elastic to permit expansion to an increased first radius R1 that accommodates an outer diameter of the injector cup 42). The retaining clip 52 is also sufficiently resilient to permit the retaining clip 52 to assume the minimum diameter of the sidewall groove 48 once installed. When disposed in the sidewall groove 52, the midportion 55 of the retaining clip 52 resides within the sidewall groove 48, while the clip first end 53 extends into an opening 43(1) corresponding to one of the retainer through holes 45, 46, for example the first retainer through hole 45. In addition, the clip second end 54 extends into an opening 43(3) corresponding to the other of the retainer through holes 45, 46, for example the second retainer through hole 46. On the opposite side of the sidewall centerline 47, the mid portion of the retaining clip 52 obstructs the other openings 43(2), 43(4) associated with the first and second retainer through holes 45, 46.

Because the retaining clip 52 is helical, the retaining clip 52 abuts, and applies a first axial force F1 to, a first portion 48(1) of the sidewall groove 48 and abuts, and applies a second axial force F2 to, a second portion 48(2) of the sidewall groove 48. The first and second axial forces F1, F2 extend in a direction parallel to the first axis 60, are substantially equal in magnitude and opposite in direction. The first and second portions 48(1), 48(2) of the sidewall groove 48 are spaced apart along a circumference of the sidewall 43. The first and second axial forces F1, F2 stabilize the axial position of the retaining clip 52 relative to the sidewall groove 48, whereby vibration and rattle of the retainer clip 52 is minimized or eliminated. In addition, the hooked first and second ends 53, 54 contact the respective pins 20 within the retainer through holes 45, 46 and urge the pins 20 toward the clip midportion 55 to an extent that the pins 20 abut the clip midportion 55. As a result, vibration and rattle of the pins 20 is also minimized or eliminated.

In some embodiments, the fuel rail 30 is a monolithic structure in which the log 34, the injector cups 42 and the mounting bosses 33 are formed integrally from a single billet of metal. In some embodiments, the fuel rail 30 is formed integrally of metal in a forging process. In other embodiments, the fuel rail 30 may be machined from a single piece and/or manufactured using other processes such as, but not limited to, extrusion, casting, and injection molding. In still other embodiments, the fuel rail 30 may be formed of multiple pieces joined by brazing, welding or other methods.

Although the illustrated embodiment includes a fuel, rail 30 that supplies high pressure, fuel directly to the cylinders of an engine via fuel injectors 80, the fuel rail 30 is not limited to be used in a high pressure, direct injection fuel delivery system. For example, in other embodiments, the fuel rail structure may supply fuel at relatively low pressure. In still other embodiments, the fuel rail structure may supply fuel to an accessory fuel distribution connection port or fuel dependent paths and components (such as pressure relief valves) to supply fuel to cylinders indirectly or return fuel to fuel tank.

Although in the illustrated embodiment, the retaining pins 20 are cylindrical rods of uniform diameter, the retaining pins 20 are not limited to this configuration. For example, in some connection assemblies 50, the retaining pins 20 include an enlarged head, or include tapered ends. In other connection assemblies 50, the retaining pin 20 is a coiled spring pin, which may also be known as a roll spring pin or a spiral pin.

Although in the illustrated embodiment, the retaining clip 52 is formed of a spring steel wire, the retaining clip 52 is not limited to this material. It is understood that the retaining clip 52 may be formed of material the provides the required strength and resiliency. In addition, the retaining clip 52 is not limited to having a circular cross-sectional shape, and may alternatively have other cross-sectional shapes, including rectangular, ovoid, etc. as required by the specific application.

Selective illustrative embodiments of the fuel delivery system, the retaining clip and the connection assembly including the retaining clip are described above in some detail. It should be understood that only structures considered necessary for clarifying the fuel delivery system, the connection assembly and the retaining clip have been described herein. Other conventional structures, and those of ancillary and auxiliary components of the fuel delivery system, the connection assembly and the retaining clip, are assumed to be known and understood by those skilled in the art. Moreover, while working examples of the Mel delivery system, the connection assembly and the retaining clip have been described above the fuel delivery system, the connection assembly and the retaining clip are not limited to the working examples described above, but various design alterations may be carried out without departing from these devices as set forth in the claims.

We claim:

1. A retaining clip, comprising
an elastic body that partially encircles a first axis such that the retaining clip has a C-shaped profile when viewed in a direction parallel to the first axis, the retaining clip including
a first end,
a second end,
a midportion that extends helically between the first end and the second end such that the first end is offset from the second end in a direction parallel to the first axis,
a first radius of curvature at a first point midway between the first end and the second end, and
a second radius of curvature at each of a second point and a third point, wherein
the second point is located between the first point and the first end,
the third point is located between the first point and the second end,
the first radius of curvature is greater than the second radius of curvature, and
wherein retaining clip, including the first end, the second end and the midportion, has a uniform cross-sectional shape and dimension.

2. The retaining clip of claim 1, wherein the retaining clip has a circular cross-sectional shape.

3. The retaining clip of claim 1, wherein
the second point is disposed in a first portion of the retaining clip,
the first portion includes the first end and has a length dimension in a range of 3 percent to 15 percent of a length of the retaining clip,
the third point is disposed in a second portion of the retaining clip,
the second portion includes the second end and has a length dimension in a range of 3 percent to 15 percent of the length of the retaining clip, and
the length of the retaining clip corresponds to a distance between the first end and the second end.

4. The retaining clip of claim 1, wherein the pitch of the midportion is in a range of 0.3 times to 3 times a diameter of a cross section of the retaining clip.

5. A retaining clip, comprising
an elastic body that partially encircles a first axis such that the retaining clip has a C-shaped profile when viewed in a direction parallel to the first axis, the retaining clip including
a first end that comprises a first hook,
a second end that comprises a second hook, and
a midportion that extends helically between the first end and the second end such that the first end is offset from the second end in a direction parallel to the first axis,
wherein the elastic body has a uniform cross-sectional shape and dimension.

6. The retaining clip of claim 5, wherein the first hook and the second hook each define a concavity that opens toward the first axis.

7. A fuel rail assembly comprising:
a fuel rail;
a fuel injector that is supported on the fuel rail;
a first retaining pin;
a second retaining pin; and
a retaining clip,
wherein the fuel rail comprises:
a log including a main fuel channel; and
an injector cup that is disposed on an outer surface of the log, the injector cup including a sidewall that encircles a first axis, an inner surface of the sidewall defining a blind bore that
opens at one end of the injector cup,
is coaxial with the first axis, and
is in fluid communication with the main fuel channel,
an outer surface of the sidewall defining a circumferentially-extending sidewall groove,
the sidewall defining
a first retainer through hole that is coaxial with a second axis that is perpendicular to the first axis and is disposed on one side of the first axis,
a second retainer through hole that is parallel to the second axis and is disposed on an opposite side of the first axis relative to the first retainer through hole,
the fuel injector comprises:
an injector housing that includes
a fuel inlet end that is disposed in the bore,
a fuel outlet end that is opposite to the fuel inlet end, the fuel outlet end disposed outside of the bore,
an annular injector groove located between a mid point of the injector housing and the fuel inlet end, the injector groove being disposed in the bore,
the first retaining pin is disposed in the first retainer through hole such that a portion of the first retaining pin resides in the injector groove, and the second retaining pin is disposed in the second retainer through hole such that a portion of the second retaining pin resides in the injector groove, whereby the first and second retaining pins retain the fuel inlet end of the fuel injector within the bore, and
the retaining clip partially encircles an outer surface of the injector cup, the retaining clip having a first end that is disposed in the first retainer through hole and a second end that is disposed in the second retainer through hole.

8. The fuel rail assembly of claim 7, wherein
the first retainer through hole is a hole that intersects the sidewall surface at a first sidewall location and a second sidewall location,
the second retainer through hole is a hole that intersects the sidewall at a third sidewall location and a fourth sidewall location, the first end of the retaining clip is disposed in the first retainer through hole at the first sidewall location, the second end of the retaining clip is disposed in the second retainer through hole at the third sidewall location, and a midportion of the retaining clip overlies the first retainer through hole at the second sidewall location and the second retainer through hole at the fourth sidewall location.

9. The fuel rail assembly of claim 7, wherein the first retainer through hole is a hole that intersects the sidewall surface at a first sidewall location and a second sidewall location, the second retainer through hole is a hole that intersects the sidewall at a third sidewall location and a fourth sidewall location, the first end of the retaining clip is disposed in the first retainer through hole at the first sidewall location and contacts the first retaining pin, and the second end of the retaining clip is disposed in the second retainer through hole at the third sidewall location and contacts the second retaining pin.

10. The fuel rail assembly of claim 7, wherein the retaining clip includes a midportion that is disposed between the first end and the second end, and the midportion is disposed in an annular sidewall groove defined in an outer surface of the sidewall.

11. The fuel rail assembly of claim 7, wherein the injector cup includes an annular sidewall groove provided in an outer surface of the sidewall, the sidewall groove intersecting the first retainer through hole and the second retainer through hole, and the retaining clip extends helically between the first end and the second end, and a midportion of the retaining clip is disposed in the sidewall groove, the mid portion applies a first axial force to a first portion of the sidewall groove, and a second axial force to a second portion of the sidewall groove, where the first axial force and the second axial force are applied in opposite directions.

\* \* \* \* \*